(12) United States Patent
Merkel et al.

(10) Patent No.: US 10,208,810 B2
(45) Date of Patent: Feb. 19, 2019

(54) FRICTIONALLY ACTING DEVICE WITH END DISK ARRANGEMENT, METHOD FOR PRODUCING AN INTERMEDIATE DISK FOR SUCH AN ARRANGEMENT

(71) Applicant: BorgWarner Inc., Auburn Hills, MI (US)

(72) Inventors: Harald Otto Merkel, Angelbachtal (DE); Robert Wiese, Eppelheim (DE)

(73) Assignee: BorgWarner Inc., Auburn Hills, MI (US)

( * ) Notice: Subject to any disclaimer, the term of this patent is extended or adjusted under 35 U.S.C. 154(b) by 20 days.

(21) Appl. No.: 15/093,188

(22) Filed: Apr. 7, 2016

(65) Prior Publication Data

US 2016/0298698 A1    Oct. 13, 2016

(30) Foreign Application Priority Data

Apr. 8, 2015 (DE) .......................... 10 2015 004 278
Aug. 26, 2015 (DE) .......................... 10 2015 011 206

(51) Int. Cl.
*F16D 13/64* (2006.01)
*B32B 37/12* (2006.01)

(52) U.S. Cl.
CPC .... *F16D 13/648* (2013.01); *B32B 2037/1253* (2013.01); *B32B 2317/12* (2013.01);
(Continued)

(58) Field of Classification Search
None
See application file for complete search history.

(56) References Cited

U.S. PATENT DOCUMENTS

| 5,460,255 A * | 10/1995 | Quigley ................. F16D 13/64 |
| | | 188/264 D |
| 8,424,664 B2 * | 4/2013 | Fabricius .............. F16D 13/648 |
| | | 192/107 R |

(Continued)

*Primary Examiner* — Jacob S. Scott
*Assistant Examiner* — Timothy Hannon
(74) *Attorney, Agent, or Firm* — BrooksGroup

(57) ABSTRACT

The present invention relates to a frictionally acting device (2) comprising a disk pack (28) made from a first disk set (30) which is connected rotationally fixed to a first disk carrier (16) and a second disk set (36) which is connected rotationally fixed to a second disk carrier (18), wherein the disks (32, 34; 38, 40, 42) of the two disk sets (30, 36) are arranged alternating one after another and can be frictionally engaged with one another, the disks (32, 34) of the first disk set (30) are designed as friction lining disks, and an end disk arrangement (54; 56) is assigned to the disk pack (28). The end disk arrangement (54; 56) has an end disk (58; 60) connected rotationally fixed to the first disk carrier (16) and an intermediate disk (62; 64) which follows the end disk (58; 60), is connected rotationally fixed to the first disk carrier (16), and is designed as a friction lining disk with a friction lining (72; 74) fixed to the side facing away from the end disk (58; 60), said friction lining (72; 74) can be frictionally engaged with a disk (38; 42) of the second disk set (36). In addition, the present invention relates to a method for manufacturing an intermediate disk (62; 64) and to a use of an intermediate disk (62; 64) manufactured in such a way.

13 Claims, 2 Drawing Sheets

Figure 1:
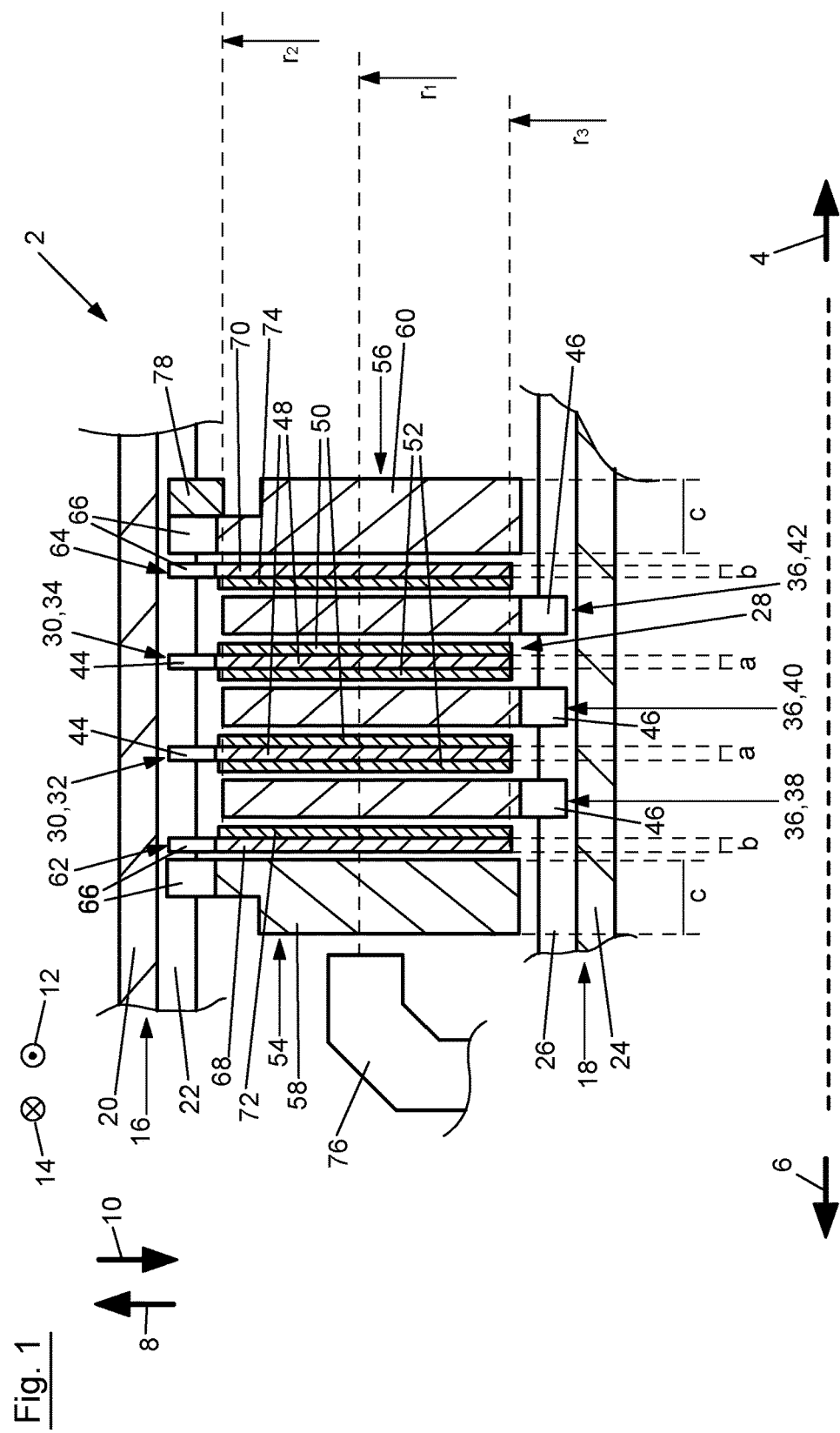

(52) U.S. Cl.
CPC ...... *B32B 2605/08* (2013.01); *F16D 2300/10* (2013.01); *F16D 2300/12* (2013.01)

(56) References Cited

U.S. PATENT DOCUMENTS

| | | | | |
|---|---|---|---|---|
| 2004/0074708 A1* | 4/2004 | Schmidt | ............... | F16D 25/12 188/71.5 |
| 2004/0182672 A1* | 9/2004 | Hartner | ............... | B32B 37/144 192/107 M |
| 2005/0000776 A1* | 1/2005 | Merkel | ............... | F16D 13/648 192/109 R |
| 2005/0284723 A1* | 12/2005 | Zagrodzki | ........... | F16D 25/0638 192/70.14 |
| 2007/0062777 A1* | 3/2007 | Zagrodzki | ............. | F16D 13/648 192/70.2 |
| 2013/0161144 A1* | 6/2013 | Ohr | ........................ | F16D 13/64 192/70.11 |
| 2015/0275993 A1* | 10/2015 | Elsesser | ................. | F16D 13/72 188/264 D |

* cited by examiner

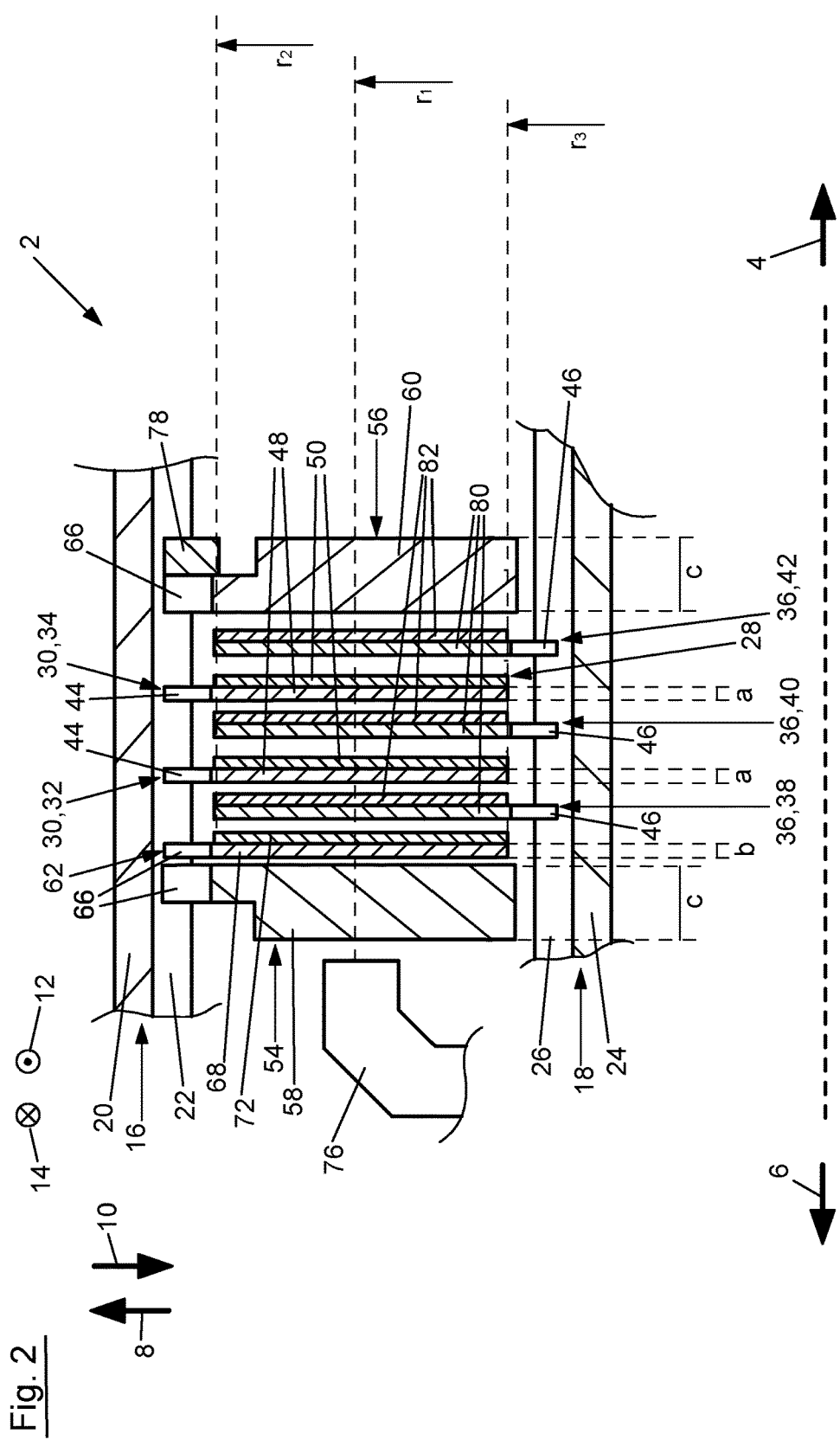

FRICTIONALLY ACTING DEVICE WITH END DISK ARRANGEMENT, METHOD FOR PRODUCING AN INTERMEDIATE DISK FOR SUCH AN ARRANGEMENT

CROSS-REFERENCE TO RELATED APPLICATIONS

This application claims the benefit of both German Patent Application Nos. 102015004278.5 filed Apr. 8, 2015 and 102015011206.6 filed Aug. 26, 2015, the disclosure of which is herein incorporated by reference in its entirety.

DESCRIPTION

The present invention relates to a frictionally acting device comprising a disk pack made from a first disk set which is connected rotationally fixed to a first disk carrier, and a second disk set which is connected rotationally fixed to a second disk carrier, wherein the disks of the two disk sets are arranged alternating one after another and can be frictionally engaged with one another, the disks of the first disk set are designed as friction lining disks, and an end disk arrangement comprising an end disk is assigned to the disk pack. In addition, the present invention relates to a method for producing an intermediate disk or a friction lining disk for such a frictionally acting device.

The initially cited frictionally acting devices, for example, coupling devices or multiple disk coupling devices, are known from the prior art, wherein the end disk arrangements each have an end disk which is designed to be thicker than the disks of the first disk set in order to stabilize the disk pack, and a friction lining is fixed on the side of the end disk facing the disk pack. It has been shown that the production or manufacture of this type of devices is difficult, in particular, is protracted and cost-intensive.

It is therefore an object of the present invention to refine a frictionally acting device of the generic type in such a way that this may be easily produced in a time-saving way without weakening the stabilizing effect of the end disk arrangement. In addition, the underlying object of the present invention is to describe a method for producing an intermediate disk or a friction lining disk for a frictionally acting device which can be carried out easily and in a time-saving way.

This problem is solved by the features listed in Patent Claim 1 or 14. Advantageous embodiments of the invention are the subject matter of the subclaims.

The present invention relates to a frictionally acting device. The frictionally acting device may be, for example, a clutch, a disk clutch, a brake, or a disk brake. The frictionally acting device has a disk pack. The disk pack is essentially composed of a first disk set which is connected rotationally fixed to a first disk carrier, and a second disk set which is connected rotationally fixed to a second disk carrier. Thus, the disks of the first disk set may, for example, be outer or inner disks, while the disks of the second disk set may, for example, be inner or outer disks. Correspondingly, the first disk carrier may be designed as an outer or inner disk carrier, and the second disk carrier as an inner or outer disk carrier. The disks from both disk sets are arranged alternatingly one behind another in such a way that they may be frictionally engaged with one another. The disks of the first disk set are thereby designed as friction lining disks. Thus, the friction lining disks of the first disk set may, for example, be provided with a friction lining on one side or on both sides. In addition, an end disk arrangement is assigned to the disk pack. The end disk arrangement is composed of an end disk and an intermediate disk. The end disk is connected rotationally fixed to the first disk carrier, wherein the intermediate disk following the end disk is also connected rotationally fixed to the first disk carrier. It is hereby preferred if the intermediate disk follows the end disk directly, thus no additional disks are arranged therebetween. In each case, the intermediate disk is designed as a friction lining disk which has a friction lining, for example, a paper friction lining, fixed on the side facing away from the end disk. This friction lining or the friction side formed by the friction lining on the side of the intermediate disk facing away from the end disk may in turn be frictionally engaged with a disk of the second disk set. One advantage of the invention consists in that the friction lining may be applied substantially more easily on the intermediate disk than is the case for an individual thick-walled end disk, in particular if the friction lining would have to be fixed to the end disk using heat. Analogously, a division of the end disk arrangement of a conventional type is carried out here in a first section in the form of the end disk and a second section in the form of the intermediate disk. While the first section in the form of the end disk functions essentially for stabilizing the disk pack, the second section formed by the, where appropriate, thinner intermediate disk functions to accommodate or fix the friction lining, wherein the friction lining may be fixed to the second section substantially more easily, particularly as the intermediate disk has a lower thickness in every case than the intermediate disk and the end disk together.

In a preferred embodiment of the device according to the invention, the intermediate disk is designed as a friction lining disk provided with the friction lining on one side, particularly as an additional friction lining does not necessarily have to be provided between the intermediate disk and the assigned end disk of the end disk arrangement, which clearly simplifies the structure of the device and the end disk arrangement. Nonetheless, the intermediate disk may basically also have an additional friction lining of the side thereof facing the end disk, which, for example, may then be advantageous if the other disks of the first disk set are provided with a friction lining on both sides. In the latter case, the intermediate disk might then be manufactured analogously to the disks of the first disk set without increasing the number of parts.

In another preferred embodiment of the device according to the invention, the end disk is designed as a disk without a friction lining or as a steel disk in order to prevent a costly fixing of a friction lining on the, where appropriate, thicker-walled, end disk, and thus to simplify the manufacturing.

In one advantageous embodiment of the device according to the invention, the intermediate disk has a friction lining carrier, on which the friction lining, where appropriate a paper friction lining, is fixed. The friction lining carrier is preferably a metallic or steel annular disk.

In another advantageous embodiment of the device according to the invention, the friction lining is glued on the friction lining carrier of the intermediate disk, which guarantees not only a secure fixing of the friction lining on the friction lining carrier of the intermediate disk, but also permits a simplified manufacturing. In this context, it has proven to be advantageous to glue the friction lining with the aid of a phenol resin to the friction lining carrier of the intermediate disk. In addition, it is preferred in this embodiment if the friction lining was glued using heat applied to the friction lining carrier of the intermediate disk. Thus, the adhesive used, for example, the phenol resin, may polymerize or cure, due to the heating of the friction lining carrier, in order to guarantee a secure fixing of the friction lining on the friction lining carrier of the intermediate disk. Due to the separation of the end disk arrangement into an end disk and an intermediate disk, heating the friction lining carrier of the intermediate disk is less costly or time intensive, which enables a simple and fast production of a frictionally acting device designed in this way.

In order to be able to apply the friction lining of the intermediate disk particularly easily to the friction ling carrier of the intermediate disk, the friction lining carrier of the intermediate disk has the same thickness or a lesser thickness than the end disk. It has hereby proven advantageous, if the thickness of the friction lining carrier is one-third of the thickness of the end disk or less. In addition, a logical functional separation is hereby achieved between the accommodation of the friction lining on the one hand, namely on the intermediate disk, and the stabilization of the disk pack on the other hand, namely by the end disk.

Due to the at least two-part design of the end disk arrangement, namely the separation into an end disk and an intermediate disk, different materials may basically be used for the intermediate disk or the friction lining carrier thereof than for the end disk. Thus, the friction lining carrier of the intermediate disk has, in another advantageous embodiment of the device according to the invention, a higher heat conductivity than the end disk in order to simplify or shorten the gluing of the friction lining carrier [sic: friction lining] to the friction lining carrier of the intermediate disk using heat applied to the friction lining carrier of the intermediate disk, and thus to reduce the manufacturing costs and the manufacturing time.

According to another advantageous embodiment of the device according to the invention, the intermediate disk and the end disk each have a rotary driving contour, by means of which the intermediate disk and the end disk may be brought into or may be in rotary driving engagement with the first disk carrier. It is hereby preferred if the intermediate disk and the end disk with the respective rotary driving contours thereof may be brought into or are in direct rotary driving engagement with the first disk carrier.

Basically, the intermediate disk may be initially formed separately from the end disk in order to fix said intermediate disk to the end disk, in particular after applying the friction lining. In another preferred embodiment of the device according to the invention, the intermediate disk and the end disk are each designed separately from one another and/or are moveable relative to one another, and thus are not formed as one-piece with one another or fixedly connected to one another. This reduces the manufacturing cost, in particular if the intermediate disk is designed similarly to the disks of the first disk set, or at least partially identical in construction to these disks.

In a particularly preferred embodiment of the device according to the invention, the disks of the first disk set are designed as friction lining disks provided on one side with a friction lining, where appropriate, a paper friction lining. On the other hand, the disks of the second disk set in this embodiment are preferably designed as friction lining discs provided on one side with a friction lining, where appropriate, a paper friction lining.

Alternatively or supplementally to the previously described embodiment, the disks of the first disk set are designed, in another preferred embodiment of the device according to the invention, as friction lining disks provided on both sides with a friction lining, where appropriate, a paper friction lining, while the disks of the second disk set are preferably designed as steel disks or disks without a friction lining.

According to another advantageous embodiment of the device according to the invention, the disks of the first disk set each have a friction lining carrier, on which the friction lining(s), where appropriate, (a) paper friction lining(s), is/are fixed. The friction lining carrier is preferably essentially a metallic or steel annular disk. It is also preferred in this embodiment if the friction lining(s) is/are glued to the friction lining carrier of the disks of the first disk set, where appropriate, using a phenol resin, particularly preferably is/are glued using heat applied to the friction lining carrier.

In order to further reduce manufacturing costs of the device, the friction lining carrier of the intermediate disk, in another preferred embodiment of the device according to the invention, has the same thickness as at least one of the friction lining carriers, preferably the majority of the friction lining carriers, particularly preferably all friction lining carriers, of the disks of the first disk set. In this way, the friction lining carriers of the disks of the first disk set and the friction lining carrier of the intermediate disk may be generated in one process step without requiring a conversion of the machines for manufacturing the friction lining carriers for the disks of the first disk set and for the intermediate disk.

The previously mentioned advantage also applies, in particular, for another preferred embodiment of the device according to the invention, in which the friction lining carrier of the intermediate disk is designed to be identical in construction to at least one of the friction lining carriers, preferably to the majority of the friction lining carriers, particularly preferably to all friction lining carriers of the disks of the first disk set. Thus, for example, the rotary driving contours or tooth systems provided on the friction lining carriers are designed to be identical in construction in order to reduce the manufacturing cost.

In another advantageous embodiment of the device according to the invention, an actuation element is provided for transmitting an actuation force to the disk pack. The actuation element may, for example, be an actuation piston or a force transmission element interacting with the actuation piston.

In another advantageous embodiment of the device according to the invention, the actuation element is arranged in such a way that this interacts with the disk pack via the end disk arrangement and/or via the side of the disk pack facing away from the end disk arrangement. In other words, the end disk arrangement in this embodiment is arranged either on the force introduction side or on the side of the disk pack facing away from the force introduction side. In a particularly advantageous embodiment variant, two end disk arrangements of the described type are thereby provided, of which the one end disk arrangement is arranged on the force introduction side facing the actuation element while the other end disk arrangement is arranged on the side of the disk pack facing away from the force introduction side.

In another advantageous embodiment of the device according to the invention, the previously mentioned actuation element is moveable or drivable, for example, moveable or drivable in the axial direction. It has hereby proven advantageous if the actuation element is hydraulically moveable or drivable. Thus, for example, a corresponding pressure chamber, to which a hydraulic pressure is applied, may be assigned to the actuation element or to an actuation piston interacting with the actuation element.

In another advantageous embodiment of the device according to the invention, the actuation element is directly or indirectly in rotary driving engagement with the first end disk carrier in order to largely prevent a relative rotation between the actuation element and, where appropriate, the end disk arrangement assigned to the actuation element. The rotary driving engagement is achieved in this embodiment preferably by means of a positive locking fit between the first disk carrier and the actuation element.

In order to effect a secure force introduction and a good stabilization of the disk pack, despite the division of the end disk arrangement into an end disk and an intermediate disk, the end disk of the end disk arrangement is supported or is supportable in the region of the center friction radius.

Alternatively of supplementally to the previously described embodiment, the end disk, in another advantageous embodiment of the device according to the invention, is supported or is supportable on a flat surface or on an annular flat surface on the intermediate disk in order to affect a secure support of the disk pack.

In another advantageous embodiment of the device according to the invention, the first disk carrier is designed as the outer disk carrier and the second disk carrier is designed as the inner disk carrier. It is hereby further preferred if the first disk carrier designed as the outer disk carrier forms the input side of the frictionally acting device, thus for example, the input side of the coupling device, and the second disk carrier, in contrast, forms the output side.

In another advantageous embodiment of the device according to the invention, the frictionally acting device is a coupling device, thus for example, a clutch or disk clutch. Furthermore, it is preferred in this embodiment if the frictionally acting device is a wet coupling device.

The method according to the invention functions to manufacture an intermediate disk or a friction lining disk for a frictionally acting device of the type according to the invention and has the method steps subsequently described in greater detail. Thus, initially a friction lining carrier is provided, which may be, for example, essentially a metal or steel annular disk. This provided friction lining carrier may form the friction lining carrier of the intermediate disk and/or the friction lining disk. After providing the friction lining carrier, an adhesive is applied to the friction lining carrier. Subsequent to this, a friction lining, where appropriate, a paper friction lining, is applied to the friction lining carrier with the adhesive as an intermediate layer. Subsequently or simultaneously, the friction lining carrier is heated to polymerize the adhesive in order to fix the friction lining to the friction lining carrier.

In a preferred embodiment of the method according to the invention, the friction lining carrier is heated to at least 200° C. to polymerize the adhesive. A temperature range between 240° C. and 280° C. has hereby proven to be advantageous.

According to an advantageous embodiment of the method according to the invention, the friction lining carrier is heated already after the application of the adhesive and prior to the application of the friction lining to pre-polymerize or pre-cure the adhesive. A temperature of at least 80° C., to which the friction lining carrier is heated, has hereby proven advantageous.

In the use according to the invention, an intermediate disk and/or friction lining disk, manufactured according to the previously described method according to the invention for manufacturing an intermediate disk or a friction lining disk, is used in a frictionally acting device of the type according to the invention.

With respect to the advantages of the method and the use of the intermediate disk and/or friction lining disk, which were manufactured according to the method according to the invention, reference is made to the previously described advantages of the frictionally acting device, which apply in corresponding ways to the manufacturing method and to the use.

The invention will be subsequently described in greater detail on the basis of exemplary embodiments with reference to the attached drawings:

FIG. 1 shows a partial cross-sectional view of a first embodiment of the device according to the invention in a cut-away view, and FIG. 2 shows a partial cross-sectional view of a second embodiment of the device according to the invention in a cut-away view.

FIG. 1 shows a first embodiment of a frictionally acting device 2, which may be designed, for example, as a coupling device, wherein it is preferably a wet coupling device. In the figures, the opposing axial directions 4, 6, the opposing radial directions 8, 10, and the opposing circumferential directions 12, 14 are indicated on the basis of corresponding arrows, wherein frictionally acting device 2, or at least parts thereof, are rotatable around an axis of rotation, indicated with dashed lines, extending in axial directions 4, 6.

Frictionally acting device 2 has one first disk carrier 16 and one second disk carrier 18. First disk carrier 16, of which only the essentially tube-shaped disk carrier segment 20 is shown in FIG. 1, is designed in the depicted embodiment as an outer disk carrier, wherein a rotary driving contour 22 facing inward in radial direction 10 is provided on disk carrier segment 20, while second disk carrier 18 is designed as an inner disk carrier, wherein of the inner disk carrier, only the essentially tube-shaped disk carrier segment 24 is indicated in FIG. 1 and which has a rotary driving contour 26 facing outward in radial direction 8. A disk pack 28 of frictionally acting device 2 is arranged in radial direction 8, 10 between disk carrier segment 20 of first disk carrier 16 on the one side and disk carrier segment 24 of second disk carrier 18 on the other side.

Disk pack 28 is composed essentially from a first disk set 30 comprising disks 32, 34 and a second disk set 36 comprising disks 38, 40, 42. Disks 32, 34 of first disk set 30 are connected rotationally fixed to first disk carrier 16. For this purpose, disks 32, 34 each have a rotary driving contour 44 facing outward in radial direction 8, which rotary driving contour 44 is in rotary driving engagement with rotary driving contour 22 on disk carrier section 20, wherein rotary driving contour 44 is designed as toothing or external teeth. Disks 32, 34 of first disk set are thereby displaceable in axial direction 4, 6 relative to first disk carrier 16. Disks 38, 40, 42 of second disk set 36 are, in contrast, connected rotationally fixed to second disk carrier 18, wherein disks 38, 40, 42 each have, for this purpose, a rotary driving contour 46 which is in rotary driving engagement with rotary driving contour 26 on disk carrier section 24 of second disk carrier 18, wherein disks 38, 40, 42 are displaceable in axial direction 4, 6 relative to second disk carrier 18. Rotary driving contour 46 is also designed as a toothing, here as internal teeth, on disks 38, 40, 42. As is apparent from FIG. 1, disks 32, 34 of first disk set 30 and disks 38, 40, 42 of second disk set 36 are arranged alternating behind one another in axial direction 4, 6 such that they may be brought in to frictional engagement with one another when disk pack 28 is pressed together in axial direction 4, 6.

Disks 32, 34 of first disk set 30 are designed as friction lining disks. Thus, disks 32, 34 each have a friction lining carrier 48, wherein a friction lining 50, 52, preferably a paper friction lining, is fixed on both the side facing in axial direction 4 and also on the side facing in axial direction 6 respectively. Friction linings 50, 52 are thereby glued on respective friction lining carrier 48, wherein a phenol resin is preferred as the adhesive. Friction linings 50, 52 may also be glued on friction lining carrier 48 under the application of heat to associated friction lining carrier 48. It is apparent from the preceding description that disks 32, 34 of first disk set 30 are designed as friction lining disks provided with a friction lining 50, 52 on both sides. Disks 38, 40, 42 of second disk set 36 are, in contrast, designed as steel disks or as disks without friction linings. Friction lining carriers 48 of disks 32, 34 have a thickness a, which may also be designated as an extension of friction lining carrier 48 in axial directions 4, 6.

Furthermore, a first end disk arrangement 54 and a second end disk arrangement 56 are assigned to disk pack 28. While first end disk arrangement 54 is arranged in axial direction 6 next to disk pack 28, second end disk arrangement 56 is arranged in axial direction 4 next to disk pack 28. Both end disk arrangements 54, 56 have respectively an end disk 58, 60, which is connected rotationally fixed to first disk carrier 16, and an intermediate disk 62 or 64, which is connected rotationally fixed to first disk carrier 16 following respective end disk 58 or 60 in axial direction 4 or 6. End disks 58, 60 are thereby designed as steel disks or as disks without friction linings, while intermediate disks 62, 64 are designed as friction lining disks. End disks 58, 60 and intermediate disks 62, 64 each have a rotary driving contour 66 by means of which intermediate disks 62, 64 and end disks 58, 60 are in, in this case direct, rotary driving engagement with first disk carrier 16, in that rotary driving contours 66 are in rotary driving engagement with rotary driving contour 22 on disk carrier section 20 of first disk carrier 16. Nonetheless, end disks 58, 60 and intermediate disks 62, 64 are displaceable in axial direction 4, 6 relative to first disk carrier 16, wherein end disks 58 or 60 and intermediate disks 62 or 64 assigned to one another are additionally designed separately from one another and are moveable relative to one another in axial directions 4, 6.

Intermediate disks 62, 64 designed as friction lining disks each have a friction lining carrier 68, 70, which is designed essentially as a metallic or steel annular disk, and is provided on the previously mentioned rotary driving contour 66 of respective intermediate disks 62, 64. Intermediate disks 62, 64 in the depicted embodiment are thereby designed as friction lining disks provided with a friction lining on one side. Thus, intermediate disk 62 has a friction lining 72, which may be brought into frictional engagement with disk 38 of second disk set 36, and which is fixed on friction lining carrier 68 facing in axial direction and away from end disk 58. In contrast, intermediate disk 64 has a friction lining 74, which is fixed on the side of friction lining carrier 70 facing in axial direction 6 and away from associated end disk 60, and which may be brought into frictional engagement with disk 42 of second disk set 36. On the sides facing the associated end disk 58 or 60, intermediate disks 62 or 64 are, in contrast, not provided with a friction lining, such that intermediate disks 62, 64, as previously mentioned, are friction lining disks provided with a friction lining 72 or 74 on one side.

Friction linings 72, 74 are also preferably paper friction linings, wherein friction linings 72, 74 are preferably glued to the associated friction lining carrier 68 or 70. A phenol resin is also preferably used in this case as the adhesive, wherein the gluing is preferably carried out with the application of heat to respective friction lining carrier 68, 70, about which more details will be introduced later. In each case, friction lining carriers 68, 70 have a thickness b, thus a corresponding extension in axial directions 4, 6. It has hereby proven advantageous from a manufacturing point of view if the friction lining carrier(s) 68, 70 of intermediate disks 62, 64 have the same thickness as at least one of friction lining carriers 48, preferably as a majority of friction lining carriers 48, particularly preferably as all of friction lining carriers 48, of disks 32, 34 of first disk set 30, such that in the depicted embodiment, a=b applies.

In addition, end disks 58, 60 each have a thickness c. Friction lining carrier 68 or 70 of intermediate disk 62 or 64 has thereby the same thickness or a lower thickness than associated end disk 58 or 60, that is, b c applies. In this context, a ratio has proven to be advantageous, in that thickness b of friction lining carrier 68 or 70 of intermediate disk 62 or 64 is one-third or less of thickness c of associated end disk 58 or 60. In other words, b≤⅓×c preferably applies. In this context, it is further mentioned that friction lining carrier 68 or 70 of intermediate disk 62 or 64 may be manufactured from a material which has a higher heat conductivity than the material of associated end disk 58 or 60, in order to simplify the fixing of respective friction lining 72 or 74 on associated friction lining carrier 68 or 70 of intermediate disk 62 or 64, to be described later.

Frictionally acting device 2 further has an actuation element 76 for transmitting an actuation force to disk pack 28. Actuation element 76 is moveable or drivable in axial directions 4, 6 relative to disk pack 28, wherein it is preferred if actuation element 76 is hydraulically moveable or drivable. Actuation element 76 may thereby be designed, for example, as a force transmission element for transmitting an actuation force from an actuation piston to disk pack 28; however, it is likewise possible that actuation element 76 forms the actuation piston itself. Actuation element 76 interacts with disk pack 28 via first end disk arrangement 54, while second end disk arrangement 56 is arranged on the side of disk pack 28 facing away from actuation element 76. Second end disk arrangement 56 or end disk 60 thereof is thereby fixed on first disk carrier 60 in axial direction 4, in this case by means of a locking ring 78. Actuation element 76 is also directly or indirectly in rotary driving engagement with first disk carrier 16, wherein this is carried out preferably in an interlocking way and may be realized, for example, by actuation fingers of actuation element 76 which extend through openings in a support section of first disk carrier 16; although this is not shown in FIG. 1 for reasons of transparency.

Disk pack 28 additionally has a center friction radius $r_1$, which corresponds to an average value from the outer friction radius $r_2$ and the inner friction radius $r_3$. As is apparent in FIG. 1, actuation element 76 is arranged in such a way that it is supported or is supportable at end disk 58 in the region of center friction radius $r_1$ if actuation element 76 is moved in radial direction 4. This applies analogously to first end disk arrangement 54 and to second end disk arrangement 56. Thus, end disk 58 is supported or is supportable at associated intermediate disk 62 in the region of center friction radius $r_1$ of disk pack 28 upon closing frictionally acting device 2, wherein end disk 58 in a is supported or is supportable on a flat surface or on an annular flat surface on intermediate disk 62 in this region. This applies analogously to second end disk arrangement 56, in which end disk 60 is supported or is supportable preferably on a flat surface or on an annular flat surface at associated intermediate disk 64 in the region of center friction radius $r_1$ of disk pack 28.

FIG. 2 shows a second embodiment of frictionally acting device 2, which corresponds substantially with the first embodiment according to FIG. 1, such that subsequently only the differences shall be dealt with; the same references numerals are used for the same or similar parts, and the previous description correspondingly applies in general.

In the second embodiment, a two-part, second end disk arrangement 56 is omitted, instead second end disk arrangement 56 is limited to single end disk 60 generally used in the prior art without providing previously mentioned intermediate disk 64. In addition, disks 32, 34 of first disk set 30 are no longer provided on both sides with friction lining 50, but instead only on one side, while a friction lining is no longer provided or fixed on the side of friction lining carrier 48 facing in axial direction 6. In the second embodiment, disks 38, 40, 42 of second disk set 36 are likewise designed as friction lining disks provided on one side with a friction lining, preferably a paper friction lining. Thus, disks 38, 40, 42 of second disk set 36 are composed of a friction lining carrier 80 and a friction lining or a paper friction lining 82, wherein the latter is fixed, preferably glued, on the side of friction lining carrier 80 facing in axial direction 4. In contrast, no friction lining 82 is provided or fixed on the side of friction lining carrier 80 facing in axial direction 6. It is also apparent from FIG. 2 that friction lining carrier 68 of intermediate disk 62 is designed to be identical in construction to at least one of friction lining carriers 48, preferably to the majority of friction lining carriers 48, particularly preferably to all friction lining carriers 48 of disks 32, 34 of first disk set 30. In addition, in the depicted embodiment, not only are friction lining carriers 48, 68 designed to be identical in construction, but also intermediate disk 62 as a whole, thus including friction lining carrier 68 and friction lining 72, is designed to be identical in construction to disks 32, 34 of first disk set 30.

An embodiment of the method for manufacturing one of intermediate disks 62, 64 and/or at least one of disks 32, 34 designed as friction lining disks of first disk set 30 or disks 38, 40, 42 of second disk set 36 is to be briefly introduced in the following, wherein this is to be explained as an example by means of intermediate disk 62.

Within the context of the method for manufacturing intermediate disk 62, initially friction lining carrier 68 of intermediate disk 62 is provided. Subsequently, an adhesive is applied to one side of friction lining carrier 68, in this case on the side of friction lining carrier 68 facing axial direction 4 in the installed state. The adhesive is preferably a phenol resin, wherein it is further preferred if friction lining carrier 68 is heated after the application of the adhesive or phenol resin such that a pre-polymerization of the adhesive or phenol resin occurs. Such a preheating of friction lining carrier 68 should preferably be at least 80° C. Subsequently, friction lining 72 is applied or pressed onto friction lining carrier 68, wherein this is carried out with the adhesive or phenol resin being situated between friction lining carrier 68 on the one side and friction lining 72 on the other. In connection to this, friction lining carrier 68 is heated, wherein the heating is preferably carried out in a form encompassing friction lining carrier 68 and friction lining 72 and which preferably exerts uniform pressure on friction lining 72. Due to the heating of friction lining carrier 80 [sic: 68], a curing or a polymerization now occurs of the adhesive or phenol resin. Friction lining carrier 68 is to be hereby heated to at least 200° C., wherein, in particular, temperatures in the range between 240° C. and 280° C. have proved advantageous. Subsequently, an intermediate disk 62, 64 or one of the other friction lining disks manufactured in this way may be used in a frictionally acting device 2 of the type previously described with reference to FIGS. 1 and 2.

It is apparent from the previous description of the method for manufacturing intermediate disk 62, 64 or a friction lining disk that the heating of friction lining carrier 68, 70 of intermediate disk 62, 64 is significantly easier and potentially faster than in the case of an end disk arrangement, which is solely made from a one-piece and thick-walled end disk. Thus, the previously described two-part embodiment of end disk arrangement 54 or 56 guarantees that the friction lining may be applied easily and quickly to intermediate disk 62, 64, while the associated end disk 58, 60 of the respective end disk arrangement 54 or 56 may summon, when used, the necessary stability for disk pack 28.

LIST OF REFERENCE NUMERALS

2 Frictionally acting device
4 Axial direction
6 Axial direction
8 Radial direction
10 Radial direction
12 Circumferential direction
14 Circumferential direction
16 First disk carrier
18 Second disk carrier
20 Disk carrier segment
22 Rotary driving contour
24 Disk carrier segment
26 Rotary driving contour
28 Disk pack
30 First disk set
32 Disk
34 Disk
36 Second disk set
38 Disk
40 Disk
42 Disk
44 Rotary driving contour
46 Rotary driving contour
48 Friction lining carrier
50 Friction lining
52 Friction lining
54 First end disk arrangement
56 Second end disk arrangement
58 End disk
60 End disk
62 Intermediate disk
64 Intermediate disk
66 Rotary driving contour
68 Friction lining carrier
70 Friction lining carrier
72 Friction lining
74 Friction lining
76 Actuation element
78 Locking ring
80 Friction lining carrier
82 Friction lining
a Thickness of the friction lining carriers
b Thickness of the friction lining carriers of the intermediate disks
c Thickness of the end disks
$r_1$ Center friction radius
$r_2$ Outer friction radius
$r_3$ Inner friction radius

The invention claimed is:

1. A frictionally acting device comprising a disk pack made from a first disk set which is connected rotationally fixed to a first disk carrier and a second disk set which is connected rotationally fixed to a second disk carrier, wherein a number of disks of the first disk set and a number of disks of the second disk set are arranged alternating one after another and can be frictionally engaged with one another, the number of disks of the first disk set are designed as friction lining disks and an end disk arrangement is assigned to the disk pack, wherein the end disk arrangement has an end disk connected rotationally fixed to the first disk carrier, and an intermediate disk having a friction lining carrier on which a friction lining is fixed and follows the end disk, the friction lining carrier being connected rotationally fixed to the first disk carrier, said friction lining can be frictionally engaged with a disk of the number of disks of the second disk set, wherein the friction lining carrier of the intermediate disk comprises a first material that has a higher heat conductivity than that of a second material that the end disk is comprised of.

2. The frictionally acting device according to claim 1, wherein the intermediate disk is designed with the friction lining on only one side.

3. The frictionally acting device according to claim 1, wherein the end disk is designed as a steel disk or as a disk without the friction lining.

4. The frictionally acting device according to claim 1, wherein is fixed to the friction lining carrier by a glue.

5. The frictionally acting device according to claim 1 wherein the friction lining carrier of the intermediate disk is at least one-third as thick as the end disk or less.

6. The frictionally acting device according to claim 1, wherein the intermediate disk and the end disk each have a rotary driving contour, by means of which the intermediate disk and the end disk are at least one of in direct rotary driving engagement with the first disk carrier, or are designed separately from one another or are moveable relative to one another.

7. The frictionally acting device according to claim 1, wherein the disks of the first disk set are designed as friction lining disks provided on one side with a first friction lining, while the disks of the second disk set are designed as friction lining disks provided on one side with a second friction lining.

8. The frictionally acting device according to claim 1, wherein the disks of the first disk set each have a friction lining carrier, on which friction linings are fixed.

9. The frictionally acting device according to claim 8, wherein the friction lining carrier of the intermediate disk is as thick as at least one of the friction lining carriers of the first disk set, the majority of the friction lining carriers of the first disk set, all friction lining carriers of the disks of the first disk set, or is designed to be identical in construction to at least one of the friction lining carriers of the first disk set.

10. The frictionally acting device according to claim 1, wherein an actuation element is provided for transmitting an actuation force to the disk pack, wherein the actuation element interacts with the disk pack via of the end disk arrangement or via the side of the disk pack facing away from the end disk arrangement.

11. The frictionally acting device according to claim 10, wherein the actuation element is directly or indirectly in rotary driving engagement with the first disk carrier.

12. The frictionally acting device according to claim 1, wherein the end disk is supported in the center friction radius of the disk pack at the intermediate disk or is supported on a flat surface or on an annular flat surface at the intermediate disk.

13. The frictionally acting device according to claim 1, wherein the first disk carrier is designed as an outer disk carrier and at least one of the second disk carrier is designed as an inner disk carrier or the frictionally acting device is a wet-running, coupling device.

* * * * *